United States Patent Office 3,249,607
Patented May 3, 1966

3,249,607
PROCESS FOR MAKING ISOCYANURIC DERIVATIVES AND NOVEL ISOCYANURATES
Bernard Taub, Williamsville, and John B. Hino, Buffalo, N.Y., assignors to Allied Chemical Corporation, New York, N.Y., a corporation of New York
No Drawing. Filed June 18, 1962, Ser. No. 202,976
8 Claims. (Cl. 260—248)

This invention relates to a process for preparing symmetrical tris-aliphatic isocyanurates, and to certain novel oxysubstituted tris-alkyl isocyanurates.

It is known to prepare symmetrical tris-aliphatic isocyanurates from cyanuric acid or a salt thereof and an aliphatic halide. For example, it is known to prepare trimethyl isocyanurate in relatively low yield, e.g. 40–45%, by heating cyanuric acid with methyl iodide in aqueous caustic soda. The ester, however, is readily degraded by warm aqueous caustic to trimethyl biuret, carbon dioxide and other compounds so that a product of low quality is obtained.

It is also known to prepare a tris-aliphatic isocyanuric ester by treating an acid salt of cyanuric acid with excess aliphatic halide. Thus triethyl isocyanurate is obtained when dipotassium cyanurate and excess ethyl iodide are heated. The ester is obtained in low yield and is contaminated with a substantial quantity of cyanuric acid. Alternatively it has been disclosed that trisaliphatic isocyanurates are obtained by heating trisilver cyanurate with a primary aliphatic halide. The silver salt, however, is costly and the isocyanuric ester obtained is frequently contaminated with the isomeric cyanuric ester which is difficult to remove.

It is an object of the present invention to provide an improved process for preparing symmetrical trisaliphatic isocyanurates in high yields from a trialkali metal cyanurate and a primary aliphatic halide.

Another object of the present invention is to provide novel acyloxalkyl and hydroxyalkyl isocyanurates.

These and other objects are accomplished according to our invention wherein a primary, saturated aliphatic halide of formula $$RCH_2X$$

wherein R is as defined below, is reacted in substantially anhydrous medium with a trialkali metal salt of cyanuric acid in the presence, as diluent or reaction medium, of N-alkyl aliphatic amide which is liquid at normal room temperatures (20–25° C.) and which preferably has a boiling point between about 150° C. and about 220° C.

The reaction of our invention proceeds according to the following reaction scheme in which the metal, M, may be joined to the oxygen as shown (trialkali metal cyanurate) or in which the metal is joined to the nitrogen (trialkali metal isocyanurate):

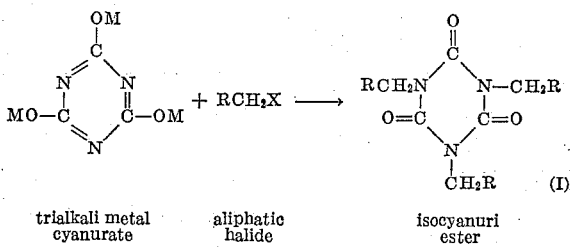

| trialkali metal cyanurate | aliphatic halide | isocyanuri ester | wherein M is an alkali metal; X is a halogen of the group consisting of chlorine, bromine and iodine, and wherein R is hydrogen, alkyl of 1 to 15 carbon atoms, cycloalkyl of 5 to 15 carbon atoms, mixed alkyl cycloalkyl of 6–15 carbon atoms or an acyloxyalkyl radical of the formula

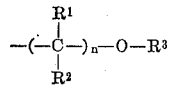

wherein $R^1$ and $R^2$ are hydrogen or alkyl, $n$ is an integer of at least 3, and the group

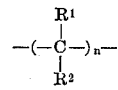

contains from 3 to 15 carbon atoms; $R^3$ is acyl of 2 to 11 carbon atoms.

Of the compounds produced according to the above reaction the symmetrical tris-alkyl isocyanurates are already known. The tris-acyloxyalkyl isocyanurates thus prepared, are new compositions of matter and have the general formula.

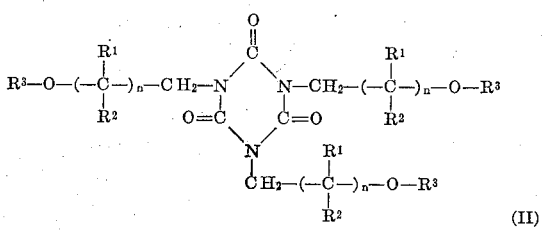

(II)

wherein the $R^1$, $R^2$ and $R^3$ substituents are as defined above. Preferred compounds in this group are the alkyl acyloxyalkyl compounds of the formula

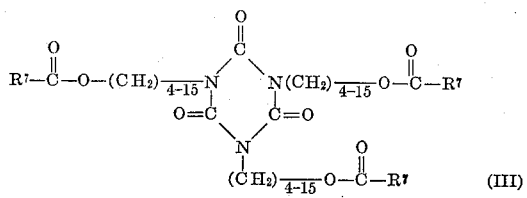

(III)

tris(acyloxyalkyl)isocyanurates wherein $R^7$ is phenyl, toluyl, or an alkyl of 1–11 carbon atoms.

The tris(acyloxyalkyl)isocyanurates, which are new compositions of matter, are obtained in good yields, usually about 65% to 85% or more of theory. They are readily hydrolyzed to split off the acyl group to form new tris(hydroxyalkyl)isocyanurate having a long alkyl chain (4 to 15 carbon atoms). Accordingly, the invention provides a novel process for preparing these new compounds in good yields and in particular for preparing tris(hydroxyalkyl) isocyanurates containing 4 to 5 carbon atoms in the hydroxyalkyl group because the latter cannot be prepared directly from the hydroxylalkyl halide due to the tendency of these halides to decompose by dehydrohalogenation to form cyclic ethers which do not condense under the conditions of the process to form the desired isocyanuric acid esters.

The hydrolysis can be accomplished by conventional methods, for example, by heating the acyloxy compound with alkali in aqueous alcohol. Conveniently, the saponification can be performed by adding approximately 20% aqueous base containing about 3 equivalents of base per mole of acyloxy compounds dropwise to a boiling, approximately 20% alcoholic solution of the acyloxy compound and subsequently boiling the mixture for about five minutes. Suitable bases include sodium hydroxide, potassium hydroxide, sodium carbonate and potassium carbonate; appropriate alcohols include methanol, ethanol and other water-miscible lower alcohols.

The new tris(hydroxyalkyl)isocyanurates of our invention thus have the general formula

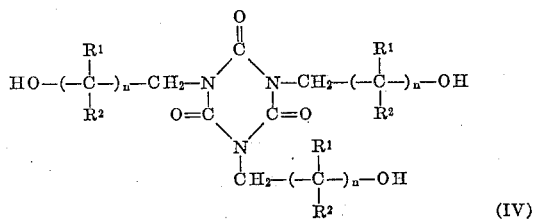

wherein $R_1$ and $R_2$ and $n$ are as defined in the basic Formula II above; $R^3$ in the basic formula now having become hydrogen. These compounds all contain at least 3 carbon atoms in the chain between the hydroxyl bearing carbon atom and the nitrogen atom of the isocyanuric acid, that is, the hydroxy alkyl chain is at least 4 carbons long and may be a straight or branched chain.

Preferred new tris(hydroxyalkyl)isocyanurates of the invention are the straight chain substituted derivatives and have the general formula shown below.

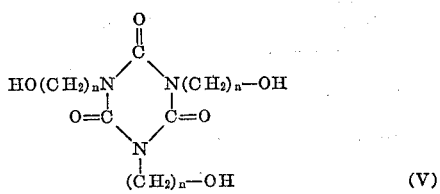

wherein $n$ is an integer from 4 to 15 inclusive.

The new tris(hydroxyalkyl)isocyanurates, which thus have 3 or more carbon atoms between the nitrogen atom of the isocyanuric acid and the hydroxyl bearing carbon atom, differ from the shorter chain hydroxyalkyl isocyanurates such as the 2-hydroxyethyl isocyanurate with the hydroxy group attached to a carbon atom which is only a single carbon atom removed from the nitrogen atom. These known 2-hydroxyalkyl isocyanurates are characterized by their conversion on heating to the corresponding 2-oxazolidones. The tris-4-hydroxy and longer chain tris-hydroxyalkyl isocyanurates are stable on heating at similar temperatures and are recovered unchanged after such treatment. The symmetrical tris-hydroxyalkyl and tris-acyloxyalkyl isocyanurates of our invention are readily converted to valuable thermosetting resins by heating to elevated temperatures (e.g. 200° C.) in the presence of a small amount of an acid catalyst, for example, p-toluene sulfonic acid in methanol, and are useful for making formed articles by molding or casting.

In carrying out the process according to our invention the aliphatic halide is preferably added gradually to a warm agitated mixture of the alkali metal cyanurate and the N-alkyl aliphatic amide while maintaining the temperature of the mixture, for example, between about 80° C. and about 90° C. On completion of the addition, the reaction mass is heated with agitation at between about 125° and about 160° C. to bring about the reaction. The resulting isocyanuric acid esters are high boiling liquids or low melting solids and are recovered in a manner appropriate to their physical characteristics. For example, the esters can be recovered by filtering to remove alkali metal chloride, evaporating to dryness and distilling the residue under reduced pressure to yield the ester product. Solid esters may be recrystallized from solvents such as methanol if desired.

To obtain the trisubstituted isocyanurate, at least about three moles of halide per mole of alkali metal cyanurate should be employed. Preferably about 3.3 to 4.0 moles of halide per mole of the salt are charged, and an especially good result is obtained when about 3.5 moles of the halide are charged. The use of more than about 5 moles of aliphatic halide per mole of alkali metal cyanurate serves no useful purpose, is wasteful of the reagent and should therefore be avoided.

A reaction temperature of at least about 125° C. is required to obtain the isocyanuric ester in satisfactory yield. Preferably a reaction temperature of about 125 to 160° C., especially 130 to 135° C., is employed. In general, carrying out the reaction at temperatures higher than about 180° can result in decomposition of the aliphatic halide and/or the product, and hence should be avoided. If necessary or desirable, the reaction can be carried out under increased or diminished pressure.

In order to obtain a satisfactory yield of product, the duration of heating should be at least about 4 hours. Heating the reaction mass for periods longer than about 24 hours generally serves no useful purpose and is to be avoided. According to the preferred mode of operation, the mixture is maintained at the predetermined reaction temperature for about 14 to 18 hours. In general the best result is obtained when the duration of heating is about 16 hours.

The use as reaction medium of an N-alkyl aliphatic amide as defined is essential to the production of hte symmetrical tris-aliphatic isocyanurates in high yields of about 65% to about 85% or more of good quality, i.e., free from excessive contamination. Use of the N-alkyl aliphatic amides as reaction medium avoids the occurrence of hydrolytic side reactions such as cleavage of the isocyanuric ring and facilitates isolation of a relatively anhydrous product of high quality. In the preparation of the acyloxy esters, the use of the N-alkyl aliphatic amide reaction medium serves to protect the water-sensitive acyloxy group and prevent its breakdown which would occur in an aqueous medium.

The N-alkyl aliphatic amides employed as diluent should provide a stirrable, liquid reaction medium. Conveniently N-alkyl aliphatic amides are used which have boiling points between about 150° C. and about 220° C. Especially suitable are the N,N'-dialkyl aliphatic amides of the formula

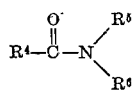

wherein $R^4$ is hydrogen or lower alkyl, $R^5$ and $R^6$ are lower alkyl, for example, N,N'-dimethylformamide; N,N' - diethylformamide; N,N' - dimethylacetamide and N,N' - diethylacetamide. Also suitable are the N - lower alkyl aliphatic lactams, such as, for example, N - methyl - ε - caprolactam; N - methyl - γ valerolactam and also the N-lower alkyl 2-pyrrolidones such as N-methyl-2-pyrrolidone. The preferred diluent of our invention is the readily available N,N-dimethylacetamide. To obtain the product in high yield, the amount of N-alkyl aliphatic amide employed should be about 1 to 6 parts per part by weight of the alkali metal cyanurate. Preferably about 3 to 5 parts of the amide are charged and generally an especially good result is obtained when about 4.5 to 5 parts of amide per part by weight of free salt are employed.

Either the anhydrous alkali metal cyanurate or a hydrate thereof can be employed in the present process, but to obtain high yields of product use of the anhydrous salt is preferred. Any trialkali metal cyanurate can be employed including trilithium, trisodium, tripotassium, and tricesium cyanurate but we prefer to use the readily prepared sodium salt. (P. Lemoult Ann. de Chem. (7) 16 386 (1899).)

The aliphatic halide charged can be any saturated primary alkyl chlroide, bromide, or iodide, containing from 1 to 15 carbon atoms or an acyloxy derivative thereof in which the acyl group contains from four to eleven carbon atoms, and in which the carbon atom bearing the acyloxy group is separated from the carbon bearing the halogen by a chain of at least three saturated carbon atoms. Suitable aliphatic halides include:

methyl iodide
sec. propyl bromide 2,3-dimethylhexylchloride
4-cyclohexylbutyl iodide
9,9-dimethyl dodecyl bromide
n-hexyl chloride
n-butyl bromide
4-chloro-1-butanol acetate
4-chloro-1-butanol benzoate
8-iodo-2-octano toluate
5-chloro-1-pentanol acetate
7-chloro-1-heptanol benzoate Preferably the readily available aliphatic chlorides are employed in the present procedure. The preferred acyloxy-alkyl halides of the present method are the conveniently prepared primary acetates and benzoates of straight chain α,ω-halohydrins. (J. Am. Chem. Soc. 69 2581 (1947).)

The present process has a number of advantages over known procedures as will be obvious to those skilled in the art. Firstly, symmertical tris-aliphatic isocyanurates of high quality are obtained in improved yield from inexpensive and readily obtained starting materials; secandly the present method affords a method for producing tris-aliphatic acyloxy isocyanurates containing readily hydrolyzable substituents conveniently and in high yields, thirdly, the instant invention affords a new method for preparing tris-hydroxyalkyl isocyanurates having alkyl chains of four or more carbon atoms, fourthly it provides novel oxy-substituted isocyanuric esters which are precursors of valuable resins.

*Example I*

Over a period of one hour 39.6 parts (0.33 mole) of n-hexylchloride was added dropwise to a mixture of 19.5 parts (0.1 mole) of trisodium cyanurate in 94.3 parts of diemthylacetamide maintained at 80°. On completion of the addition, the reaction mixture was heated at 130° for 16 hours, cooled to 50° and filtered. The filtrate was evaporated to dryness under diminished pressure on a steam bath and the residue was distilled under reduced pressure to yield 27 parts (71%) of tris-n-hexyl-isocyanurate, B.P. 202–209°/2.4 mm.; literature B.P. 199–200°/2 mm.

*Example II*

A mixture of 58.5 parts (0.3 mole) of trisodium cyanurate and 188.6 parts of dimethylacetamide was treated with 131 parts (0.87 mole) of 4-chloro-1-butanol acetate according to the procedure described in Example I. The yield of tris-(4-acetoxybutyl)isocyanurate (B.P. 265–266°/1.5 mm.) was 106 parts (78%).

*Example III*

A mixture of 39.0 parts (0.2 mole) of trisodium cyanurate and 188.6 parts of dimethylacetamide was treated with 140 parts (0.66 mole) of 4-chloro-1-butanol benzoate according to the procedure of Example I. Tris-(4-benzoxybutyl)isocyanurate, recrystallized from ethanol (M.P. 67–70°) was obtained in a yield of 106 parts (81%).

*Example IV*

A mixture of 97.5 parts (0.5 mole) of trisodium cyanurate and 282.9 parts of dimethylacetamide was treated with 247 parts (1.5 moles) of 5-chloro-1-pentanolacetate according to the procedure described in Example I. Tris-(5-acetoxypentyl)isocyanurate, B.P. 275–277/1.6 mm. was obtained in a yield of 178 parts (69%).

*Example V*

A mixture of 11.7 parts (0.06 mole) of trisodium cyanurate and 97.5 parts of dimethylacetamide was treated with 48 parts of 7-chloro-1-heptanol benzoate according to the procedure described in Example I except that the crude product tris-(7-benzoxyheptyl)isocyanurate which was obtained as a viscous oil (47.5 parts), was not further purified.

*Example VI*

A solution of 2.5 parts of sodium hydroxide in 15 parts of water was added dropwise to a boiling solution of 10 parts (.0213 mole) of tris-(4-acetoxybutyl)isocyanurate in 50 parts of methanol. On completion of the addition, the reaction mixture was boiled for five minutes, cooled to ambient temperature, and evaporated to dryness under reduced pressure. Acetone (50 parts) was added to the mass and precipitated sodium acetate was removed by filtration. The filtrate on evaporation to dryness afforded an oily residue which crystallized on standing. Recrystallization from ethyl acetate yielded 6.8 parts (92.5% of tris-(4-hydroxybutyl)isocyanurate), M.P. 79–80°.

*Analysis.*—Calculated for $C_{15}H_{27}N_3O_6$: C, 52.2; H, 7.8; N, 12.2. Found: C, 52.6; H, 7.3; N, 12.5.

*Example VII*

Tris-(5-hydroxypentyl)isocyanurate was obtained by saponification of the corresponding tris-(5-acetoxypentyl)isocyanurate according to the procedure described in Example V. The product was a viscous liquid which did not crystallize at ambient temperature.

*Analysis.*—Calculated for $C_{18}H_{33}N_3O_6$: C, 55.8; H, 8.6. Found: C, 55.8; H, 8.5.

*Example VIII*

Tris-(4-hydroxybutyl)isocyanurate (5.0 parts) was heated in a still at 250° at 1 to 2 mm. for 10 hours and was recovered substantially unchanged; M.P. after recrystallization from ethyl acetate, 76–78°, M.P. of starting material 79–80°. Under these conditions, the known tris-(2-hydroxyalkyl)isocyanurates are converted readily to the corresponding 2-oxazolidones (U.S. application Serial No. 848,214).

The following examples illustrate the utility of the novel compounds of the invention as precursors of thermosetting resins.

*Example IX*

Tris-(4-acetoxybutyl)isocyanurate (5 parts), methyl alcohol (7.9 parts) and p-toluene sulfonic acid (0.1 part) were heated over a period of 4 hours to 145° under an atmosphere of nitrogen. During the heating methyl alcohol and methyl acetate were evolved. The mixture was heated at 200° for 16 hours and cooled to ambient temperature. The product obtained was a clear hard transparent thermosetting resin.

*Example X*

Tris-(4-hydroxybutyl)isocyanurate (3 parts) and p-toluene-sulfonic acid (0.1 part) were heated at 200° for 7 hours under an atmosphere of nitrogen and cooled to ambient temperature. The product obtained was a thermosetting resin.

While the above describes the preferred embodiments of the invention, it will be understood that departures may be made therefrom within the scope of the specification and claims.

We claim:
1. Tris-(4-acetoxybutyl)isocyanurate.
2. Tris-(4-benzoxybutyl)isocyanurate.
3. Tris-(5-acetoxypentyl)isocyanurate.
4. Tris-(7-benzoxyheptyl)isocyanurate.
5. Tris-(4-hydroxybutyl)isocyanurate.
6. A symmetrical tris-(oxysubstituted alkyl) isocyanurate compound of the formula

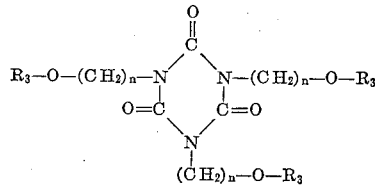

wherein $n$ is an integer of 4–15 and $R_3$ is hydrogen or a radical of the formula $$-\overset{O}{\underset{\|}{C}}-R_7$$

wherein $R_7$ is phenyl, toluyl or an alkyl of 1–11 carbon atoms.

7. A compound as defined in claim 6 wherein $n$ is an integer of 4 to 7.

8. A compound as defined in claim 7 wherein $R_7$ is phenyl, toluyl or methyl.

References Cited by the Examiner

UNITED STATES PATENTS

| 2,414,289 | 1/1947 | Ericks | 260—238 X |
| 2,706,194 | 4/1955 | Morris et al. | 260—248 X |
| 2,894,950 | 7/1959 | Lloyd et al. | 260—248 |
| 3,075,979 | 1/1963 | Tazuma et al. | 260—248 |
| 3,121,082 | 2/1965 | Guttag | 260—248 |

OTHER REFERENCES

Frazier et al.: J. Org. Chem., vol. 25, pages 1944 to 1946 (1960).

Sayigh et al.: J. Chem. Soc., 1961, pages 3148–9 (July).

Sisler et al.: "College Chemistry," pages 409 to 410, The Macmillan Co., New York (1953).

WALTER A. MODANCE, *Primary Examiner.*

NICHOLAS S. RIZZO, *Examiner.*

JOHN D. RANDOLPH, *Assistant Examiner.*